US011568608B2

(12) United States Patent
Driancourt et al.

(10) Patent No.: US 11,568,608 B2
(45) Date of Patent: Jan. 31, 2023

(54) AUGMENTED REALITY DISPLAY DEVICE AND PROGRAM RECORDING MEDIUM

(71) Applicant: SQUARE ENIX CO., LTD., Tokyo (JP)

(72) Inventors: Remi Driancourt, Tokyo (JP); Makoto Tsuda, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 17/303,998

(22) Filed: Jun. 11, 2021

(65) Prior Publication Data

US 2021/0390785 A1 Dec. 16, 2021

(30) Foreign Application Priority Data

Jun. 14, 2020 (JP) .............................. JP2020-102750

(51) Int. Cl.
*G06T 19/00* (2011.01)
*G06T 13/20* (2011.01)
*G06V 10/40* (2022.01)
*G06V 20/00* (2022.01)

(52) U.S. Cl.
CPC ............ *G06T 19/006* (2013.01); *G06T 13/20* (2013.01); *G06V 10/40* (2022.01); *G06V 20/00* (2022.01)

(58) Field of Classification Search
None
See application file for complete search history.

(56) References Cited

U.S. PATENT DOCUMENTS

| 8,884,984 | B2* | 11/2014 | Flaks ...................... G06F 3/005 |
| | | | 345/629 |
| 9,898,871 | B1* | 2/2018 | Reagan ................. G06T 19/006 |
| 10,489,949 | B2 | 11/2019 | Yamasaki et al. |
| 2013/0100165 | A1 | 4/2013 | Komiyama |
| 2018/0165863 | A1 | 6/2018 | Kubo et al. |
| 2021/0064122 | A1 | 3/2021 | Fujinawa et al. |

FOREIGN PATENT DOCUMENTS

| JP | 2012108842 A | 6/2012 |
| JP | 2013092887 A | 5/2013 |
| JP | 2013122708 A | 6/2013 |
| JP | 2014071838 A | 4/2014 |
| JP | 2016218974 A | 12/2016 |

(Continued)

OTHER PUBLICATIONS

[English Translation] Notice of Reasons for Rejection dated Jul. 20, 2021 for Japanese Application No. 2020-10750, pp. all.

(Continued)

*Primary Examiner* — Robert J Craddock
(74) *Attorney, Agent, or Firm* — Dorsey & Whitney LLP (57) ABSTRACT

Provided is an augmented reality display technology capable of more entertaining a user.
An augmented reality display device 10 includes an imaging unit 13, a special effect execution unit 11*b*, and a display unit 14. The imaging unit 13 acquires a background image of a real world. When a plurality of models for a specific combination are present in a virtual space, the special effect execution unit 11*b* executes a special effect corresponding to the combination of the models. The display unit 14 displays the models together with the background image based on the special effect.

6 Claims, 6 Drawing Sheets

(56) References Cited

FOREIGN PATENT DOCUMENTS

| | | | |
|---|---|---|---|
| JP | 2017010578 | A | 1/2017 |
| JP | 2018089227 | A | 6/2018 |
| JP | 2018094247 | A | 6/2018 |
| JP | 2019033906 | A | 3/2019 |
| WO | 2016111174 | A1 | 7/2016 |
| WO | 2019150781 | A1 | 8/2019 |

OTHER PUBLICATIONS

[English Translation] Notice of Reasons for Refusal dated Feb. 8, 2022 for Japanese Patent Application No. 2020-102750; pp. all.
[English Translation] Decision of Dismissal of Amendment dated Sep. 6, 2022 for Japanese Patent Application No. 2020-102750; pp all.
[English Translation] Notice of Decision of Refusal dated Sep. 6, 2022 for Japanese Patent Application No. 2020-102750; pp. all.

\* cited by examiner

Fig. 3A  Model Table

| Model ID | Series | Property | Category | Model Name | Operation Program |
|---|---|---|---|---|---|
| 0001 | Series A | Dynamic | Human | Model A1 | A1 |
| 0002 | Series A | Dynamic | Human | Model A2 | A2 |
| 0003 | Series A | Dynamic | Animal | Model A3 | A3 |
| 0004 | Series A | Static | Tree | Model A4 | |
| 0005 | Series A | Static | Building | Model A5 | |
| 0006 | Series B | Dynamic | Train | Model B1 | B1 |
| 0007 | Series B | Dynamic | Car | Model B2 | B2 |
| 0008 | Series B | Dynamic | Plane | Model B3 | B3 |
| 0009 | Series B | Static | Rail (Straight) | Model B4 | |
| 0010 | Series B | Static | Rail (Curve) | Model B5 | |
| ... | ... | ... | ... | ... | ... |

Fig. 3B  Special Effect Condition Table

| Special Effect | Model Combination Condition | | | | Background Condition |
|---|---|---|---|---|---|
| SE1 | Series A / Human | Series A / Human | | | |
| SE2 | Series A / Dynamic | 0004 | | | |
| SE3 | Series A | Series B | | | |
| SE4 | 0001 | 0002 | | | Edge |
| SE5 | 0001 | 0002 | | | Cup |
| SE6 | 0001 | 0002 | 0003 | | |
| SE7 | 0006 | Series B / Static | Series B / Static | | |
| ... | ... | ... | ... | ... | ... |

Fig. 3C  Owned Model Table

| User ID | Owned Model ID | Acquisition Source |
|---|---|---|
| 10001 | 0001 | Generate |
| | 0002 | Capture |
| | 0003 | Download |
| ... | ... | ... |

Fig. 4A

Model A1    Model A2

Fig. 4B

Model A1    Model A4

AUGMENTED REALITY DISPLAY DEVICE AND PROGRAM RECORDING MEDIUM

CROSS-REFERENCE TO RELATED APPLICATION(S)

This application is based upon and claims the benefit of priority of the prior Japanese Patent Application No. 2020-102750, filed on Jun. 14, 2020, the disclosure of which is expressly incorporated herein by reference in its entirety.

BACKGROUND

The present disclosure relates to a virtual reality display device that displays a virtual model superimposed on a background image of a real world, and a recording medium storing a computer program for realizing the same.

Recently, experience-based video contents referred to as Virtual Reality (VR) and Augmented Reality (AR) have been attracting attention in accordance with the development of a rendering technique of computer graphics and the spread of mobile devices, such as a smart phone and a head-mounted display. VR is a technology that blocks visibility of a real space and presents only a video of a virtual space to a user wearing mainly a head-mounted display, and highly immersive video contents can be presented to the user. In contrast, AR is a technology that displays a two-dimensional model or a three-dimensional model superimposed on a background image while presenting a real space as the background image to a user of a smart phone and a head-mounted display, and highly realistic video contents in which the real space and the virtual model are mixed can be presented to the user. The present disclosure relates to especially an augmented reality (AR) technology among these experience-based video technologies.

Relating to the AR technology, a system has been disclosed, in which, for example, when a predetermined marker in a real space is photographed by a camera included in a mobile terminal, a virtual image of a character and the like corresponding to the marker is read, composed on a background image of the real space, and displayed. Example of such systems may be found in Japanese Patent Application Publication Nos. 2016-218974 and 2017-010578. A virtual character controller that controls an operation of a virtual character displayed in a display in real-time. An image of a character design printed on a garment is recognized, and a presentation image associated with the design on a photographic subject image of a person wearing the garment is superimposed, thereby generating an augmented reality image and displaying it.

An image of one virtual character is displayed on a display, and there is a problem that a way of playing and a range of expression are limited. While it is also considered to use the conventional techniques in displaying a plurality of characters in a virtual space, simple displaying of a plurality of characters provides a poor effect of attracting user interest.

SUMMARY

Therefore, it is a main object of the present disclosure to provide a technology capable of more entertaining a user in an augmented reality display technology in which a virtual model is superimposed on a background image of a real world and displayed.

Solution to Problem

In the augmented reality display technology, when a plurality of models for a specific combination are present in a virtual space, a special effect corresponding to the combination of the models may be executed. Thus, preparing various patterns of special effect corresponding to the combination of the models allows entertaining the user for a long term without boring the user.

A first aspect of the present disclosure relates to an augmented reality display device. The augmented reality display device according to the present disclosure includes an imaging unit, a special effect execution unit, and a display unit. The imaging unit acquires a background image of a real world. The special effect execution unit is configured such that when a plurality of models for a specific combination are present in a virtual space, the special effect execution unit executes a special effect corresponding to the combination of the models. The specific combination of the plurality of models may be a combination of two models, or may be a combination of three or more models. The special effect in the present disclosure is not associated with each of the models but associated with the combination of the models. That is, the effect executed even for a single model (operation, presentation, or the like unique to the model) is not the special effect in the present disclosure, and the effect executed by the combination of the plurality of models under a specific combining method (synergistic effect of the operation, the presentation, or the like provided by the specific combination of the models) is the special effect in the present disclosure. The display unit displays the models together with the background image based on the special effect. In this application, a space in which a real space and a virtual space are combined and a virtual model is superimposed on a real background image is referred to as an "augmented reality space" for convenience.

Like the above-described configuration, by executing the special effect corresponding to the specific combination of the models in the augmented reality space, a way of playing and a way of having a fun to combine various models and cause them to appear in the space can be provided to the user. In the present disclosure, since the background image of the real space and the model of the virtual space are superimposed and displayed, the play, such as playing with action figures and making a diorama, that requires a labor for collection and a storage space in the real world can be easily performed in the augmented reality space.

In the augmented reality display device according to the present disclosure, the special effect includes causing the plurality of models for the specific combination to perform a specific operation or outputting a specific computer graphic or another model in addition to the plurality of models for the specific combination. According to the former example, by combining a plurality of specific models, the models each perform a specific operation ordinarily that is not performed by any single model. According to the latter example, in addition to the models of the specific combination, a new CG image or another model relating to the models appears. This provides a surprise to the user, and a fun of presenting the model in various patterns and a fun of collecting various kinds of models can be provided to the user.

In the augmented reality display device according to the present disclosure, the model may include a dynamic model that moves in the virtual space and a static model that stays at a specific position in the virtual space. In this case, the special effect execution unit executes the special effect corresponding to the specific combination of the dynamic model and the static model. For example, the dynamic model may be a model that moves in the augmented reality space in accordance with a predetermined operation program, and the static model may be a model not provided with such an operation program. The static model may be provided with an operation program for static model to performs a predetermined operation while staying at a specific position in a virtual space. Thus, since the special effect corresponding to the combination of the dynamic model and the static model can be prepared, the range of expression provided by the special effect can be expanded. For example, by the combination of the static model expressing a scenery, such as a rail for a railroad, a station building, and a railroad crossing, and the dynamic model such as a train running on the rails, the special effect of running on the rails can be executed to the train. This allows the play like a diorama in the augmented reality space.

The augmented reality display device according to the present disclosure may further include an image analysis unit. The image analysis unit analyzes an image including a real object and extracts a feature of the real object included in the image. The image is preferably a background image of the real world taken by the imaging unit in real-time. However, for example, the image may be an image of the real world taken in the past, or may be an image downloaded via a communication line, such as Internet. The special effect execution unit executes a special effect corresponding to a combination of the model and the feature of the real object. Accordingly, in addition to the special effect corresponding to the specific combination of the plurality of models described above, the special effect corresponding to the combination of the model and the real object also can be executed. The special effect corresponding to the combination of a plurality of models and a real object also can be prepared.

In the present disclosure, when the real object contacts the model in a display space of the display unit, the special effect execution unit may execute a special effect of applying an action by the contact, to the model. In this case, for example, when a finger of the user touches the model, or when an object of the real space touches the model, a predetermined special effect may be executed. Accordingly, a presentation as though a real object affects a virtual model can be performed.

The augmented reality display device according to the present disclosure may further include a model generation unit. The model generation unit analyzes an image including a real object and generates a two-dimensional or three-dimensional model from the real object included in the image. The model generation unit preferably sets a special effect for a combination with another model, to the generated model. Thus, by generating the model having a special effect from any given image provided from the user, the user can perform a play of combining an original model of himself/herself with another model in the augmented reality space.

The augmented reality display device according to the present disclosure may further include a model acquisition unit. The model acquisition unit analyzes an image including a real object and reads the model corresponding to the real object from a storage unit or acquires the model corresponding to the real object from a server via a communication line, based on information obtained from the real object included in the image. Thus, feature information, such as the shape and the color, of the object and code information attached to the object are acquired from the real object included in the image, and a two-dimensional or three-dimensional existing model corresponding to the object is identified based on these pieces of information. Then, the existing model may be read from the storage unit included in the augmented reality display device itself, or the existing model may be downloaded from the server via Internet and the like. Accordingly, the existing model can be utilized, thus allowing the virtual model corresponding to the real object to appear in the augmented reality space easily at a high speed.

A second aspect of the present disclosure relates to a computer program. The program according to the present disclosure causes a general-purpose portable information terminal to function as the augmented reality display device according to the first aspect described above. The exemplary portable information terminal is a smart phone, a tablet terminal, a laptop terminal, a head-mounted display, and a head-up display. The program according to the present disclosure may be preinstalled to a portable terminal device, may be downloadable via a communication line, such as Internet, or may be recorded in a computer readable medium, such as a CD-ROM.

The present disclosure can provide the augmented reality display technology capable of more entertaining the user.

DESCRIPTION OF EMBODIMENTS

The following describes embodiments of the present disclosure using the drawings. The present invention is not limited to the configurations described below, but includes those appropriately changed from the configurations below by a person skilled in the art within an obvious range.

Figure 1:
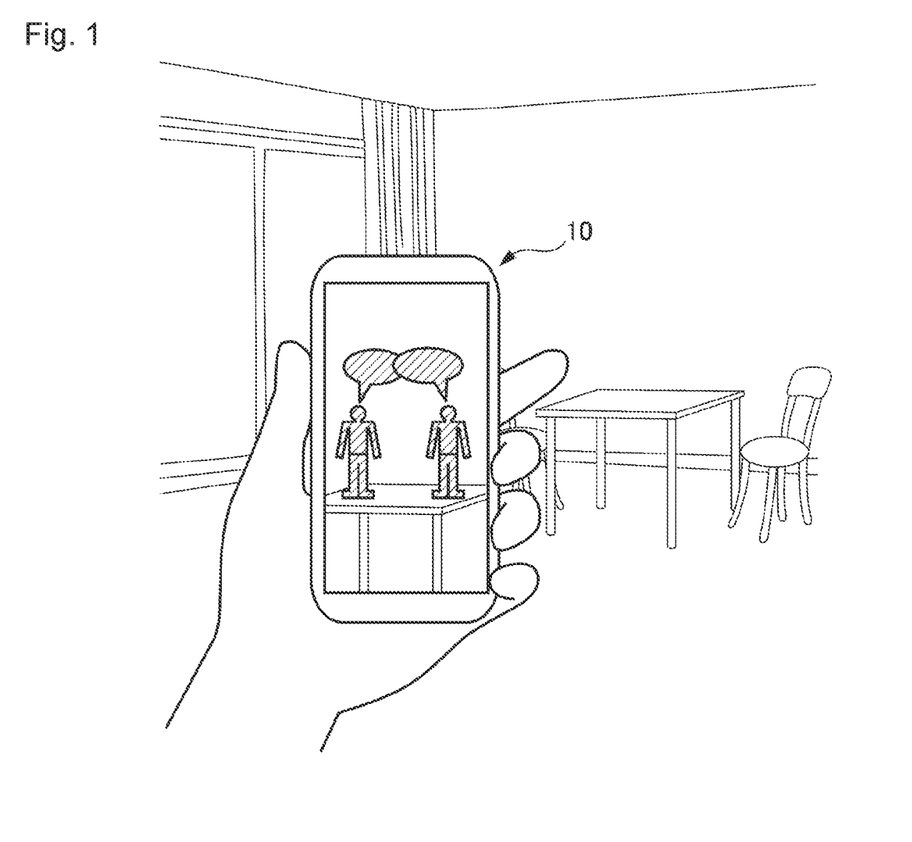
FIG. 1 illustrates one embodiment of an augmented reality display device according to the present disclosure, and schematically illustrates a state where a plurality of models are displayed in a display unit of the device.

FIG. 1 illustrates a first embodiment of an augmented reality display device 10 according to the present disclosure. In this embodiment, the augmented reality display device 10 is achieved by what is called a smart phone. As illustrated in FIG. 1, the augmented reality display device 10 uses a real space taken by an imaging unit (camera) as a background image and displays a video in which a two-dimensional or three-dimensional model is superimposed on the background image in a display unit (display). In respective drawings of this application, virtual models illustrated by a computer graphics technology are indicated with diagonal hatching.

As illustrated in FIG. 1, the augmented reality display device 10 makes a plurality of models appear in an augmented reality space in which a real space and a virtual space are combined. In this case, the augmented reality display device 10 executes a special effect corresponding to a combination of the plurality of models, and displays a virtual model together with a background image of the real space in a display unit based on the special effect. In the example illustrated in FIG. 1, an operation in which human-shaped models for a specific combination have a conversation is executed as a special effect. As a part of the special effect, images of speech bubbles, in which words spoken by the respective models are indicated, are illustrated above the heads of the human-shaped models. Thus, in the present disclosure, the plurality of models for the specific combination appear in the augmented reality space, thereby executing the special effect (operation or presentation) that ordinarily does not occur with a single model.

Note that, in the present disclosure, the assembly type model is not necessarily the human-shaped model, but may be, for example, equipment and an accessory mounted to the human-shaped model, may be the one imitating another character, or may be a vehicle shape, such as an automobile, a train, an aircraft, and a ship. While details will be described later, the assembly type model can be a model of a diorama expressing a scenery, such as a rail of a train, a station building, a railroad crossing, a construction of a building and the like, a natural object of a tree, a rock, a mountain, and the like. The assembly type model can include various kind of models in addition to those described above.

Figure 2:
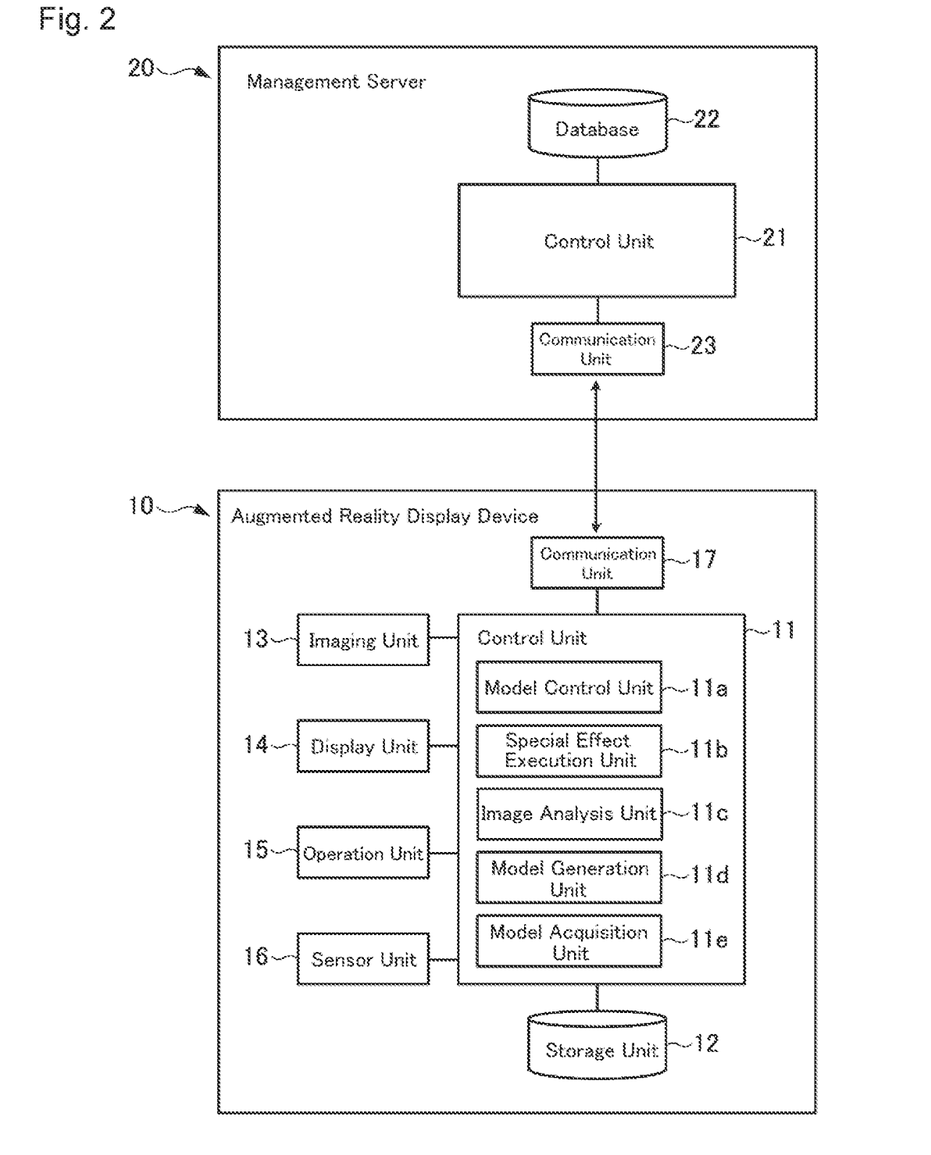
FIG. 2 is a block diagram illustrating an exemplary function composition of the augmented reality display device and a management server.

FIG. 2 is a block diagram illustrating a function composition of a server/client type system that includes the augmented reality display device 10 and a management server 20. The augmented reality display device 10 and the management server 20 are coupled via a communication line, such as Internet, and can mutually transmit and receive information. In this embodiment, the management server 20 stores information (modeling data and its metadata) regarding a plurality of models, and the augmented reality display device 10 downloads the information regarding the models from the management server 20 and causes the display unit 14 to display the information, as necessary. While the illustration is omitted, in another embodiment, the information regarding the plurality of models can be stored in the augmented reality display device 10 itself. In this case, the management server 20 is not necessary.

The augmented reality display device 10 is a device that has at least a function of taking an image of a real space and displaying the captured image and a virtual model in a superposed manner. The augmented reality display device 10 is achieved by known smart phone and head-mounted display and the like. Specifically, an application program for executing processing specific to the augmented reality display device 10 according to the present disclosure is stored in a general-purpose portable information terminal, such as a smart phone. This terminal functions as the augmented reality display device 10 according to the present disclosure by executing this program. As illustrated in FIG. 2, the augmented reality display device 10 basically includes a control unit 11, a storage unit 12, an imaging unit 13, a display unit 14, an operation unit 15, a sensor unit 16, and a communication unit 17.

The control unit 11 of the augmented reality display device 10 entirely controls the other components 12 to 17 included in the augmented reality display device 10. As the control unit 11, a known processor, such as a central processing unit (CPU) and a graphics processing unit (GPU), can be used. The control unit 11 reads an application stored in the storage unit 12, and controls the other components in accordance with the application program. Specifically, the control unit 1 causes the display unit 14 to display a background image of a real space taken by the imaging unit 13. The control unit 11 causes the display unit 14 to display a model received from the management server 20 via the communication unit 17 together with the background image, and controls a behavior and the like of this model based on input information from the operation unit 15 and the sensor unit 16. The control unit 11 includes a model control unit 11a, a special effect execution unit 11b, an image analysis unit 11c, a model generation unit 11d, and a model acquisition unit 11e as main function blocks. Details of these function blocks 11a to 11e will be described later with reference to FIG. 3A to FIG. 6B.

The storage unit 12 is a component to store information used for controlling the display of the augmented reality. Specifically, the storage unit 12 stores an application program that causes a general portable information terminal, such as a smart phone, to function as the augmented reality display device 10. The application program stored in the storage unit 12 is read by the control unit 11 when displaying the augmented reality, and processing is executed in accordance with the program. A plurality of other application programs may be stored in the storage unit 12. The storage function of the storage unit 12 can be achieved by a non-volatile memory, such as an HDD and an SDD. The storage unit 12 may have a function as a memory to write or read a progress and the like of arithmetic processing by the control unit 11. The memory function of the storage unit 12 can be achieved by a volatile memory, such as a RAM and a DRAM.

The imaging unit 13 is a camera to acquire image data of a still image or a moving image. For the camera constituting the imaging unit 13, a camera included in the augmented reality display device 10 is used. The image data acquired by the imaging unit 13 is transmitted to the control unit 11, and displayed by the display unit 14 after predetermined arithmetic processing is performed. This image data may be saved in the storage unit 12. The camera includes, for example, a lens, a mechanical shutter, a shutter driver, a photoelectric conversion element, such as a CCD image sensor unit and a CMOS image sensor unit, a digital signal processor (DSP) that reads an electric charge amount from the photoelectric conversion element to generate image data, and an IC memory.

The display unit 14 is a component that displays a predetermined image. The display unit 14 includes a known display device, such as a liquid crystal display and an organic EL display. In the present disclosure, the display unit 14 displays mainly a two-dimensional or three-dimensional model together with the background image of the real space.

The operation unit 15 is a component to input operation information to the augmented reality display device 10 by a user. A known input device, such as a touch panel, a computer mouse, a keyboard, and a stylus pen, can be used as the operation unit 15. A touch panel display may be configured by disposing the touch panel (operation unit 15) in a front surface of the display (display unit 14). The operation unit 15 may be physically separable from the augmented reality display device 10. In this case, the operation unit 15 is connected to the augmented reality display device 10 via a short-range wireless communication standard, such as Bluetooth (registered trademark).

The sensor unit 16 is a component to input sensing information to the augmented reality display device 10. The example of the sensor unit 16 includes an acceleration sensor, a gyro sensor, a microphone, a global positioning system (GPS) sensor, a proximity sensor, a luminance sensor, and the like, and the augmented reality display device 10 includes one or a plurality of kinds of sensors. In the present disclosure, the sensor unit 16 is used for a posture detection of the augmented reality display device 10. That is, the sensor unit 16 that includes the acceleration sensor and the gyro sensor detects amounts of change in a photographing direction and a photographing range of the imaging unit 13 of the augmented reality display device 10 as the sensing information. Then, the control unit 11 (mainly, model control unit 11a) uses the sensing information to control a display position and a display direction of the model. For example, the control unit 11 may perform a control such that a model is appeared at a specific position in a real space, and the model is displayed in the display unit 14 when the model present at the specific position enters in the photographing range of the imaging unit 13.

Note that the detection of the photographing direction and the photographing range by the imaging unit 13 can be performed also by the use of a Simultaneous Localization and Mapping (SLAM) technology based on a strong image recognition without using the acceleration sensor or the gyro sensor described above. An external sensor can achieve an XR device, which is a general term of an augmented reality (AR), a virtual reality (VR), a mixed reality (MR), and the like, without the image recognition. A device using these sensors and the image recognition technique is also referred to as a Mixed Reality Device. In the present disclosure, a technique used in such a Mixed Reality Device can be employed, as necessary.

The communication unit 17 of the augmented reality display device 10 is a component to communicate with mainly the management server 20 via a communication line, such as Internet. Specifically, when a download request of a predetermined model is generated by the control unit 11, the communication unit 17 transmits it to the management server 20. The communication unit 17 receives information regarding the various models stored in a database 22 of the management server 20, and transmits it to the control unit 11.

The management server 20 is a web server that has a function to mainly control the models provided to the augmented reality display device 10. The models and the information regarding them stored in the management server 20 can be updated (added, changed, deleted) as needed. The management server 20 may include one web server, or may include a plurality of web servers to which the function of the management server 20 is assigned. The management server 20 is basically managed by an operator that provides the user with a service relating to the augmented reality. As illustrated in FIG. 2, the management server 20 basically includes a control unit 21, the database 22, and a communication unit 23.

The control unit 21 of the management server 20 entirely controls the other components 22, 23 included in the management server 20. As the control unit 21, a known processor, such as a CPU and a GPU, can be used. Mainly, when receiving the download request from the augmented reality display device 10, the control unit 21 reads the model corresponding to the download request and the information regarding it from the database 22, and transmits these pieces of the information to the augmented reality display device 10 via the communication unit 23.

Figure 3A:
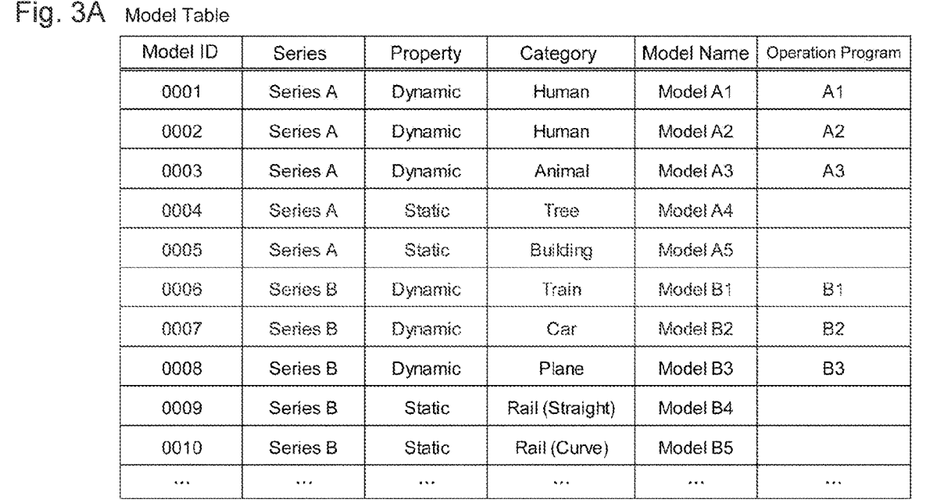
FIGS. 3A to 3C illustrate an exemplary data structure of a database that records various kinds of information regarding the models.
Figure 3B:
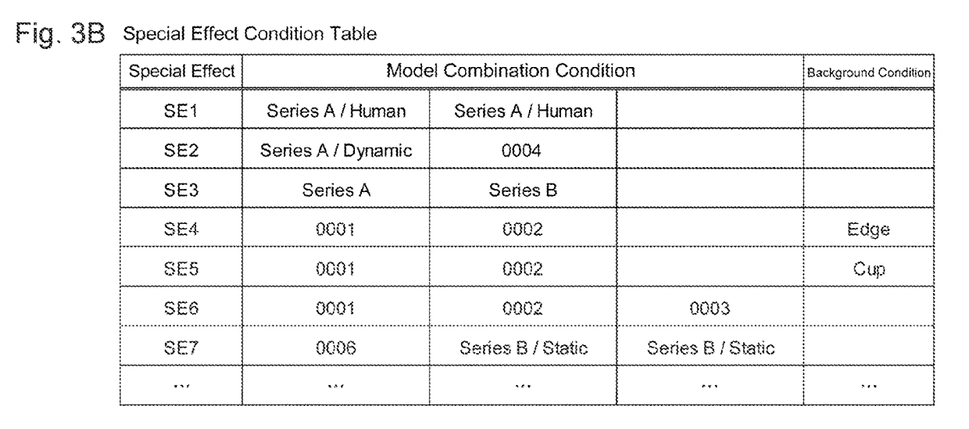
Figure 3C:
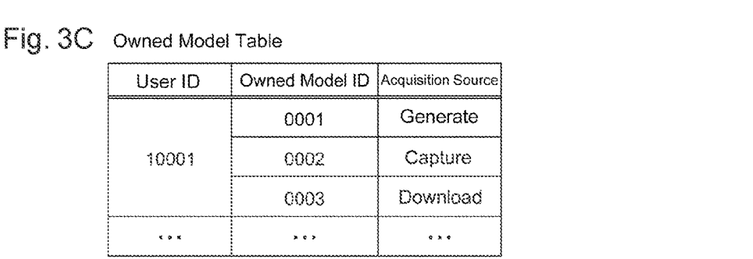

The database 22 stores the information regarding the various models provided to the augmented reality display device 10. FIGS. 3A to 3C illustrate data structures of a relational database as an example of the data included in the database 22. For example, the database 22 includes a model table of FIG. 3A, a connection condition table of FIG. 3B, and an owned model table of FIG. 3C.

The model table records the information regarding the various kinds of models displayed by the augmented reality display device 10. For example, the model table records information regarding an ID unique to the model as a key item, classification data, such as a series, a property, and a category, for classifying the model, a model name unique to the model, and an operation program specifying a basic operation of the model for each model. Specifically, the model table includes a model ID field (column), a series field, a property field, a category field, a model name field, and an operation program field.

The model ID field records identification information (ID) unique to the models. The series field records series names to which the respective models belong. For example, in the illustrated example, the model IDs 0001 to 0005 belong to Series A. and the model IDs 0006 to 0010 belong to Series B. For example, the models belonging to the same series have a common feature, for example, the same design applied thereto, a sense of unity caused by production under the same design concept, or the like. The property field records whether the model is a dynamic model (Dynamic) or a static model (Static). The dynamic model is a model moving in the augmented reality space, and the static model is a model staying at a specific position in the augmented reality space without moving in the augmented reality space. In this embodiment, basically, the dynamic model is provided with the operation program, but the static model is not provided with the operation program. However, the static model can be provided with an operation program for performing a predetermined operation on the premise that the static model stays at a specific position in the augmented reality space. The category field records the category (not necessarily a creature) to which the model is classified. In FIG. 3A, for example, while the category, such as a human shape (Human), an animal shape (Animal), a tree shape (Tree), and a building shape (Building), are illustrated, the exemplary category is not limited to those described above, but can be freely set. The model name field records the names unique to the models. The operation program field records information regarding the operation program provided to the model. The model table records identification information of the operation program and link information to the operation program.

The special effect condition table mainly records combination conditions of the models for executing the special effect. In the example illustrated in FIG. 3B, the special effect condition table basically includes a special effect field and a model combination condition field. The special effect field records information for identifying the special effect (special effect ID and the like). Program data for actually executing the special effect, image data used in the execution of the special effect, and other modeling data are stored in the database 22 in association with the identification information recorded in the special effect field. The model combination condition field records information, such as the classification data (series, property, category) of the model, the model name, or the model ID, for specifying the classification of the model or the unique model as information regarding the model combination for executing the special effect for each special effect. The model combination condition is not limited to the combination of two models, but a combination of three or more or four or more models can be specified as the condition. Like the example illustrated in FIG. 3B, as the model combination condition, the classification data, such as the series, the property, and the category of the model, can be specified or the model ID (or the model name) can be individually specified. For example, as the example of FIG. 3B, the condition "Series A/Human" means a model in which the series is "Series A" and the category is "Human." Similarly, the condition "Series A/Dynamic" means a model in which the series is "Series A" and the property is "Dynamic" (dynamic model). Thus, the model can be specified by a compound condition. Then, the models specified in the model combination condition field appear in the same augmented reality space, thereby executing the special effect.

The special effect table may further include a background condition field. The background condition field records information regarding a background condition as a further condition for executing the special effect in addition to the model combination condition. The background condition is an optional and additional condition, and includes a condition regarding a feature point included in a real background image on which the model is superimposed. For example, in the example illustrated in FIG. 3B, a case where the background image includes a feature point (Edge) that is an edge portion of an object, such as a desk, a table, and a cabinet, and a case where the background image includes a feature point (Cup) of a cup shape of an object, such as a mug are specified as the additional background conditions. Accordingly, a special effect SE4 and a special effect SE5 illustrated in FIG. 3B are executed only when the models of the model ID 0001 and the model ID 0002 specified by the model combination condition are present in the augmented reality space and the feature point (Edge) of the edge portion or the feature point (Cup) of the cup shape is detected in the background image. Thus, as the condition for executing the special effect, the condition of the feature point included in the real background image can be specified in addition to the model combination condition.

As the examples illustrated in FIGS. 3A and 313, in this embodiment, it is not that an operation or the like activated by a link with the other model is embedded in the operation program itself that specifies the basic operation of the model, but that the condition to activate the special effect for the combination with the other model is specified separately from the operation program. This eliminates the need for specifying (programming) the operation or the like linked with the other model in the generation of the operation program of each model, thus allowing additional setting of the special effect by the combination with the other model after generating each model. Generally, while it is often difficult to modify or add the operation program itself later, modifying or adding an activation condition of the special effect later can be facilitated by setting the special effect condition table as illustrated in FIG. 3B to manage the special effect condition. For example, in a case where the number of the models and the classification of the model increase as needed, since it is difficult to modify the operation programs of the respective models for each time, it is effective to manage the special effect condition by the special effect condition table. Accordingly, in this embodiment, a variability and a scalability of the special effect condition are ensured. Especially, as described later, in the one embodiment of the present disclosure, the user can capture any image and generate an original model. Thus, when the model includes a user original model, managing the special effect condition by the table as illustrated in FIG. 3B facilitates adding the special effect condition for the combination with the other model also to the user original model. The present disclosure does not eliminate preliminarily embedding the special effect (operation, presentation, and the like) by the combination with the other model in the operation program itself of each model, but this is allowed in another embodiment.

The owned model table is a table that records information regarding the owned model for each user. For example, the user can freely cause the model owned by himself/herself to appear in the augmented reality space and use it. Meanwhile, the user cannot use the model not owned by himself/herself, and for using it, it is necessary to additionally obtain it (for example, purchase, generate, exchange with another user, and given from another user). The owned model table includes a user ID field to record ID unique to the user, an owned model ID field to record ID of the model owned by the user, and an acquisition source field to record an acquisition source of each model. For the acquisition source of the model, for example, "Generate" means a model generated by the user himself/herself (for example, see FIG. 6A). "Capture" means a model downloaded from a server triggered by photographing of a predetermined real object by the user (for example, see FIG. 6B). "Download" means a model downloaded from a server by the user. In addition, as the acquisition source of the model, it is considered, for example, to exchange the model with another user and to be given from another user.

The communication unit 23 of the management server 20 is a component that communicates with mainly the augmented reality display device 10 via a communication line such as Internet. The communication unit 23 mainly transmits the information regarding the various models stored in the database 22 to the augmented reality display device 10.

Subsequently, the model control and the special effect will be described with reference to FIG. 4A to FIG. 5B. As illustrated in FIG. 4A to FIG. 5B, the augmented reality display device 10 displays a plurality of models in an augmented reality space (space in which a real space and a virtual space are combined and a virtual model is superimposed on a real background image).

In the example illustrated in FIG. 4A to FIG. 5B, the display unit 14 and the operation unit 15 constitute the touch panel display, and the user can freely operate each model by touching. The model control unit 11a included in the control unit 11 controls these models present in the augmented reality space (specifically, virtual space). For example, by sliding a finger to up and down and right and left in a state of touching the model with the one finger, the model can be moved. By sliding two fingers to up and down and right and left in a state of touching the model with the two fingers, the direction of the model can be changed. By increasing a distance between the two fingers (pinch out) and decreasing the distance between the two fingers (pinch in) in a state of touching the model with the two fingers, the size of the model can be changed. In addition, the model control unit 11a can control the move and the change of the model in the virtual space corresponding to the various operations by the user, for example, an operation of touching the model twice with one finger, and an operation of touching three times.

Figure 4A:
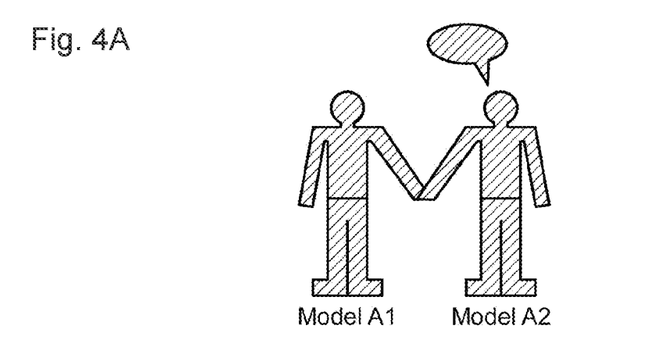
FIGS. 4A to 4C illustrate an exemplary special effect by a combination of a plurality of models.

FIG. 4A illustrates an example in which a plurality of models simultaneously appear in the same augmented reality space, thereby executing the special effect. Specifically, FIG. 4A illustrates an example of the special effect for the combination of the dynamic models. That is, the special effect execution unit 11b included in the control unit 1 confirms the information regarding the plurality of models simultaneously appeared in the same augmented reality space, and determines whether this model combination satisfies the execution condition of the special effect recorded in the special effect condition table (FIG. 3B) or not. Then, when the model combination is determined to satisfy the execution condition of the special effect, the special effect execution unit 11*b* executes the special effect corresponding to the model combination. For example, in the example illustrated in FIG. 4A, a plurality of human-shaped models (model name: Model A1. Model A2) appear in the augmented reality space, and it is seen that this model combination satisfies the execution condition of the special effect SE1 by referring to the model table illustrated in FIG. 3A and the model table illustrated in FIG. 3B. The special effect SE1 includes, for example, as illustrated in FIG. 4A, an execution of an operation in which the two models shake hands with one another, and an execution of a presentation to cause the models to have a predetermined conversation and display images of speech bubbles indicating the spoken words above the heads of the models. Accordingly, in this example, the special effect in which the two models for the specific combination have a conversation while shaking hands with one another can be executed.

Figure 4B:
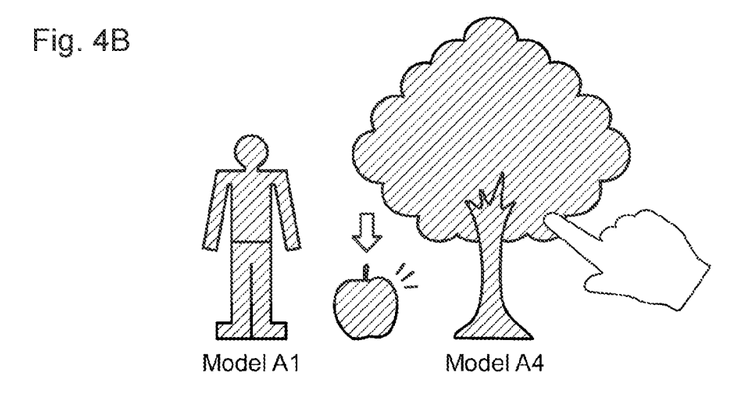

FIG. 4B illustrates an example of the special effect for the combination of the dynamic model and the static model. In the example illustrated in FIG. 4B, the human-shaped dynamic model (model name: Model A1) and a tree-shaped static model (model name: Model A4) are present in the same augmented reality space. In this case, it is seen that this model combination satisfies the execution condition of the special effect SE2 by referring to the model table illustrated in FIG. 3A and the model table illustrated in FIG. 3B. Therefore, the special effect execution unit 11*b* executes the special effect SE2. The special effect SE2 includes, for example, as illustrated in FIG. 4B, an execution of a presentation in which an apple model falls from the tree-shaped model when the user touches the tree-shaped model, and an execution of an operation in which the human-shaped model picks up the fallen apple model. Thus, the special effect can be executed also by the combination of the dynamic model and the static model. The special effect includes causing a new model (for example, apple model) other than the model for the specific combination to newly appear in the augmented reality space.

Figure 4C:
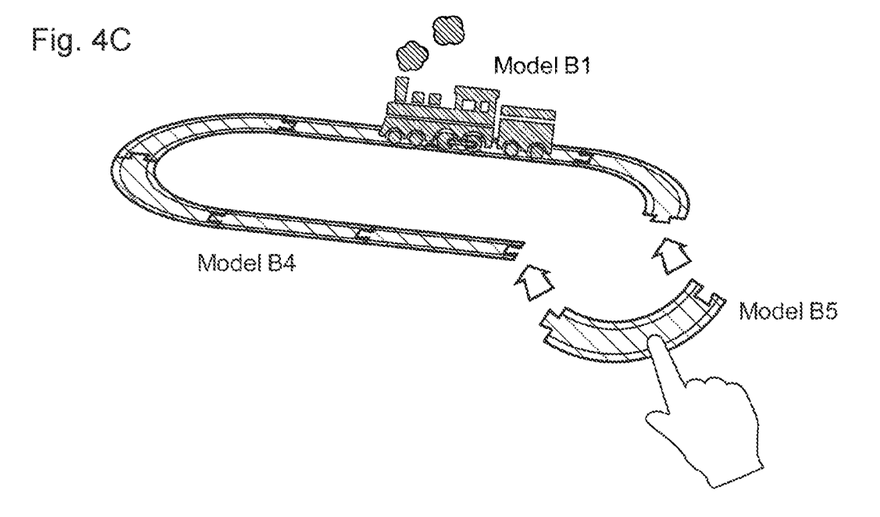

FIG. 4C illustrates an example of the special effect for the combination of the models in what is called a diorama. A plurality of rail static models (model name: Model B4, Model B5) are displayed in an augmented reality space, and these rails are connectable at the joints. That is, the rails each include the protruding joint at one end and the depressed joint at the other end, and these joints are connectable. For the rails, for example, as illustrated in FIG. 4(*c*), a straight rail (Straight), a curved rail (Curve), or a rail of another shape is prepared. The user can freely move the rail model in the augmented reality space while touching the rail model and connect the rails at the joints. Thus, the user can lay the rails in a free shape or freely extend the rails by sequentially interconnecting one rail model to the other rail model in the augmented reality space.

In the example illustrated in FIG. 4C, a train dynamic model (Train) running on the rail models is prepared. As described in detail below, the train model may be generated from a captured image of a real train, or may be read from the storage unit 12 or the database 22 based on the captured image of the real train. The train model may be acquired by reading an existing model from the storage unit 12 or the database 22. The train model is usually programmed to linearly run in the augmented reality space. Therefore, even a single train model can run in the augmented reality space. Furthermore, when the train model and a plurality of the rail models are combined in the augmented reality space, the special effect in which the train model runs on the rail models is set to be executed (see special effect SE7 in FIG. 313). The special effect execution unit 11*b* executes the special effect to operate the train model so as to run along the plurality of connected rail models. The special effect may include an effect of displaying a steam image above the train model. Therefore, the user can run his/her favorite train model on the rail models generated by himself/herself. While the illustration is omitted, the model that can be appeared in the augmented reality space is not limited to the rail or the train, but a model of a diorama expressing a scenery, such as a station building, a railroad crossing, a construction of a building and the like, a natural object of a tree, a rock, a mountain, and the like may be prepared, as necessary.

Figure 5A:
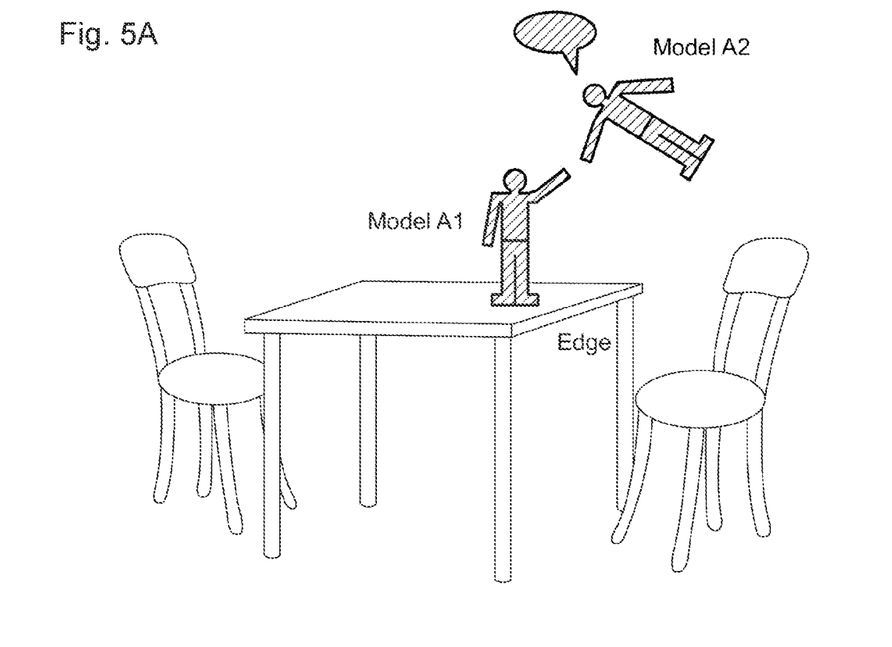
FIGS. 5A and 5B illustrate another exemplary special effect by the combination of the plurality of models.
Figure 5B:
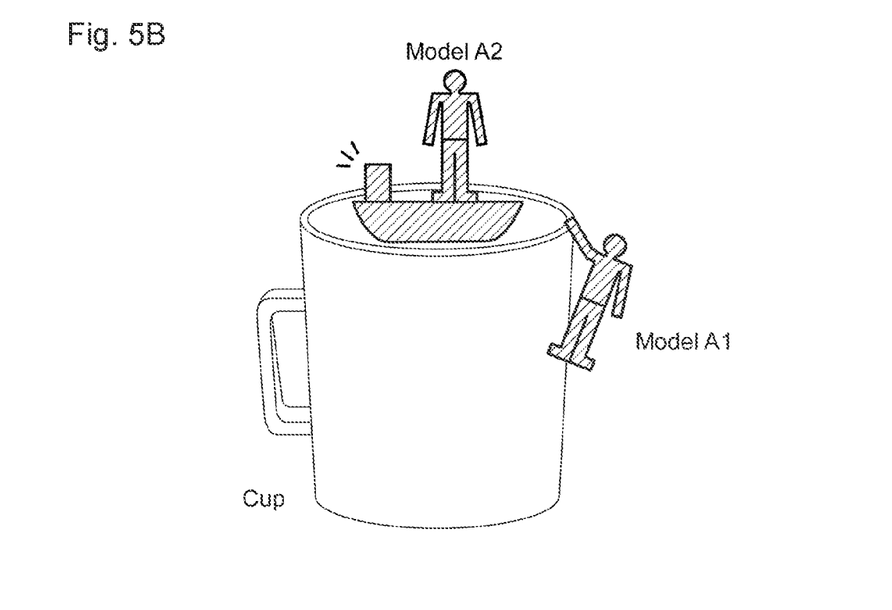

FIG. 5A and FIG. 5B illustrate examples in which the special effects are executed corresponding to the model combination condition and the background condition. Specifically, the image analysis unit 11*c* included in the control unit 11 analyzes the background image of the real space taken by the imaging unit 13 in real-time, and extracts a feature of the real object included in the background image. For example, the feature point of the real object has a preliminarily specified pattern, and the image analysis unit 11*c* analyzes whether the background image of the real space has a feature point matching the pattern or not. The image analysis unit 11*c* may extract the feature point when the feature point matching the pattern is included. In the example illustrated in FIG. 5A, the background image of the real space includes a table and chairs, and the image analysis unit 11*c* extracts the edge portion of the table as a feature point (Edge). In the example illustrated in FIG. 5B, the background image of the real space includes a mug, and the image analysis unit 11*c* extracts the whole of the mug as a feature point (Cup). Thus, the image analysis unit 11*c* analyzes the shape, the coloring, and the like of the object included in the background image, and extracts the feature point matching the preliminarily specified pattern from the image.

Next, when the image analysis unit 11*e* extracts the feature point, the special effect execution unit 11*b* confirms whether the combination of the feature point (background condition) and the plurality of models satisfies the preliminarily set condition for executing the special effect or not by referring to the special effect condition table (FIG. 3B). For example, in the example illustrated in FIG. 3B, the execution condition of the special effect SE4 is satisfied by the combination of the model IDs 0001 and 0002 and the feature point (Edge) of the edge portion. The special effect SEA is preferably a special effect relating to the feature point extracted from the background image. For example, as the example illustrated in FIG. 5A, the special effect SE4 includes executions of operations of the respective models in which one model flies off from near of the edge portion of the table extracted as the feature point and pulls up the other model.

For example, in the example illustrated in FIG. 3B, the execution condition of the special effect SE5 is satisfied by the combination of the model IDs 0001 and 0002 and the feature point (Cup) of the cup. The special effect SE5 is also preferably a special effect relating to the feature point extracted from the background image. For example, as the example illustrated in FIG. 5B, the special effect SE5 includes performing a presentation to cause a new ship model to appear in the cup extracted as the feature point and an execution of an operation in which one model gets on the newly appeared ship. An operation in which the other model hangs on the edge of the cup may be executed. Accordingly, the special effect including the specific operation and the specific presentation of the virtual model can be executed using the object included in the background image.

Figure 6A:
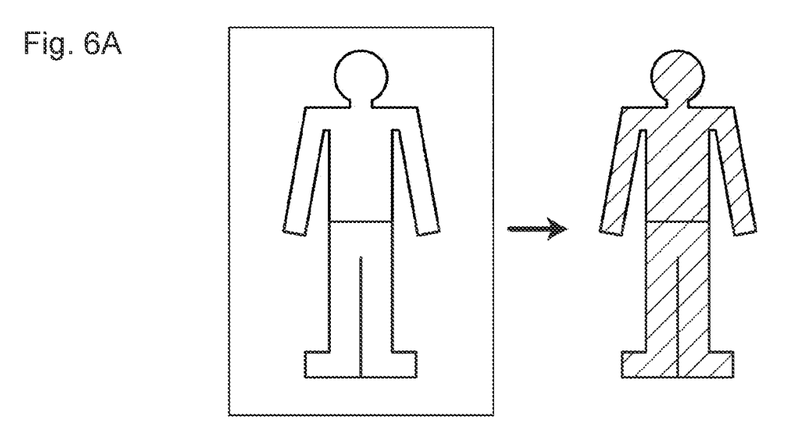
FIG. 6A schematically illustrates a process of generating a virtual model from an image of a real object.

Subsequently, an exemplary method for acquiring the model by the user with reference to FIG. 6A. FIG. 6A illustrates a method for generating a two-dimensional or three-dimensional virtual model from a real object included in a captured image. FIG. 6A illustrates a captured image including a real object, such as an action figure and an assembling model made of plastic. The real object is not limited to the action figure or the assembling model, but may be, for example, a rail of a train, a station building, a railroad crossing, a construction of a building and the like, a natural object of a tree, a rock, a mountain, and the like. The augmented reality display device 10 acquires the captured image that includes such a real object. The captured image may be an image taken by the imaging unit 13, or may be an image downloaded via Internet and the like. FIG. 6A illustrates the captured image of a front view of the object, which is sufficient for generating the two-dimensional model. On the other hand, when the three-dimensional model is generated, it is preferable to acquire a plurality of images of the same object taken from different angles. That is, it is preferable to acquire the captured images of the object taken from multiple angles, such as a back side, a left side, a right side, a plane, a bottom, and further, perspective views in addition to the front view of the object illustrated in FIG. 6A.

Next, as illustrated in FIG. 6A, the model generation unit 11d analyzes one or a plurality of the captured images and generates a two-dimensional or three-dimensional model from the real object included in the images. For example, when the two-dimensional model is generated, the model generation unit 11d may identify a contour of the real object included in one captured image to form a planar outer edge of the model along the contour, and set a coloring and a design of the model so as to correspond to a coloring and a design of the real object. When the three-dimensional model is generated, the model generation unit 11d may form a three-dimensional outer edge of the model based on a plurality of the captured images of the same object taken from the different angles and set a coloring and a design of the model so as to correspond to colorings and designs of the respective images. The process to generate the two-dimensional or three-dimensional model from the captured image is not limited to the one described above, but a known process can be employed, as necessary.

The model generation unit 11d registers the information regarding the model generated as described above to the database 22 of the management server 20. Specifically, the model generation unit 11d analyzes the feature, such as the shape and the coloring, of the newly generated model, and determines the classification data, such as the series, the property, and the category, the model name, and as necessary, the operation program indicated in the model table of FIG. 3A. The model ID is automatically assigned. For example, when the newly generated model has the feature of human shape, the model generation unit 11d classifies the newly generated model to an appropriate series depending on the shape and the coloring, and subsequently, determines the property as the dynamic model (Dynamic), determines the category as the human shape (Human), and sets any given model name. The model generation unit 11d assigns an operation program appropriate for the new model from a plurality of preliminarily prepared existing operation programs depending on the classified series, property, and category. Thus, the model generation unit 11d sets metadata corresponding to each field of the model table for the new model. Thus, by collectively managing the models generated by the respective users by the management server 20, for example, the model generated by one user can be downloaded and used by another user. In this case, the models may be exchanged, bought, and sold between the users.

As described above, the special effect for the combination of the plurality of models is managed by the special effect condition table (FIG. 313). Therefore, by assigning the classification data, such as the series, the property, and the category, to classify the model to the newly generated model as described above, the special effect for the combination with the other model is automatically set. Accordingly, in this embodiment, the special effect can be easily set also to a newly generated user original model.

Figure 6B:
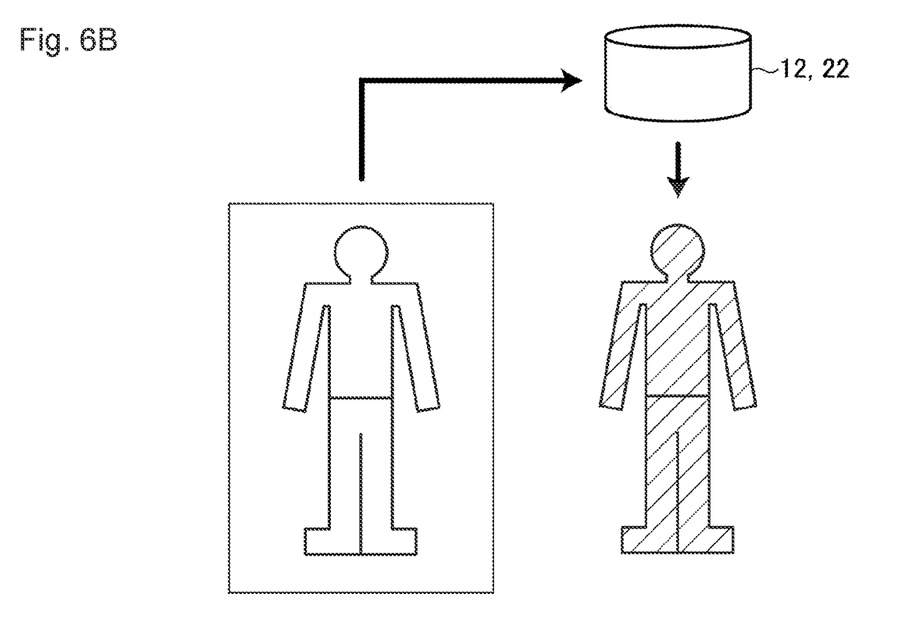
FIG. 6B schematically illustrates a process of reading a virtual model corresponding to a real object from an image of the real object.

FIG. 6B illustrates a method for reading an existing model preliminarily stored in the storage unit 12 and the database 22 based on the real object included in the captured image. That is, in the example illustrated in FIG. 6B, the two-dimensional or three-dimensional model is not newly generated, but the real object included in the captured image triggers the existing model corresponding thereto to be read from the database 22 and the like. Specifically, the model acquisition unit 11e of the control unit 11 analyzes the captured image illustrated in FIG. 6B, and extracts a feature point of the real object included in the image. The feature point includes the contour, the coloring, the design, and the like of the object. When a code, such as a two-dimensional code (barcode) and a three-dimensional code (QR code (registered trademark)), is attached to the real object, the model acquisition unit 11e may extract the code as the feature point from the captured image and acquire information embedded in the code. In this case, the ID information of the model corresponding to the real object may be embedded in the code.

Next, as illustrated in FIG. 6B, the model acquisition unit 11e reads the model corresponding to the feature point and the code (ID information) extracted from the captured image from the storage unit 12 of the augmented reality display device 10 or the database 22 of the management server 20 based on the feature point and the code (ID information) extracted from the captured image. This embodiment allows a service deployment in which, for example, the user purchases an action figure or an assembling model of an actual object and subsequently photographs it by a smart phone (augmented reality display device 10), thereby allowing downloading the two-dimensional or three-dimensional model corresponding to the action figure or the like from the management server 20. Since the models can be freely assembled or replaced with the other model in the augmented reality space, the present disclosure can expand the way of playing of the actually purchased action figure and the like.

Additionally, the user can acquire the model by selecting any given model from a plurality of existing models. For example, the model selected by the user is read from the database 22 of the management server 20 (or the storage unit 12 of the augmented reality display device 10) and appears in the augmented reality space. Therefore, as illustrated in FIG. 6A and FIG. 6B, the user can acquire the virtual model even when the user does not own an object, such as an actual action figure.

While the term of augmented reality (AR: Augmented Reality) is used in the present disclosure, the present disclosure may be categorized in the technology of a virtual reality (VR: Virtual Reality), a mixed reality (MR: Mixed Reality), or an XR that is a general term of them depending on the embodiments.

In this application, the embodiments of the present disclosure have been described above by referring to the drawings to express the contents of the present disclosure. However, the present invention is not limited to the embodiments described above, but includes changed configurations and improved configurations obvious to those skilled in the art based on the matters described in this application.

The invention claimed is:

1. An augmented reality display device, comprising:
a camera configured to acquire a background image of a real world, the background image to be used in an augmented reality (AR) space, and the background image including a real object;
a processor configured to:
determine whether a plurality of virtual models having a specific model combination are present in the AR space;
determine whether the real object having a specific feature is present in the AR space; and
if the plurality of virtual models having the specific model combination and the real object having the specific feature are present in the AR space, execute a special effect corresponding to both the specific model combination of the virtual models and the specific feature of the real object; and
a display configured to display the plurality of virtual models together with the background image based on the special effect in the AR space.

2. The augmented reality display device according to claim 1, wherein
the plurality of virtual models having the specific model combination are first virtual models, and
the special effect comprises at least one of:
causing the first virtual models to perform a specific operation; or
displaying a specific computer graphic or a second virtual model in addition to the first virtual models.

3. The augmented reality display device according to claim 1, wherein the plurality of virtual models include a dynamic model that is configured to move in the AR space and a static model that is configured to stay at a specific position in the AR space, the dynamic model and the static model having the specific model combination.

4. The augmented reality display device according to claim 1, wherein the processor is further configured to:
analyze the background image including the real object; and
extract the specific feature of the real object included in the background image.

5. The augmented reality display device according to claim 1, wherein
the real object included in the background image is a first real object,
the plurality of virtual models are first virtual models, and
the processor is further configured to:
analyze an image including a second real object to obtain information of the second real object; and
acquire a second virtual model corresponding to the second real object from a memory or from a server via a communication line, based on the information of the second real object, the second virtual model being an existing virtual model stored in the memory or the server.

6. A non-transitory recording medium storing a program which, when executed, causes a portable information terminal to perform functions comprising:
acquiring a background image of a real world, the background image to be used in an augmented reality (AR) space, and the background image including a real object;
determining whether a plurality of virtual models having a specific model combination are present in the AR space;
determining whether the real object having a specific feature is present in the AR space; and
if the plurality of virtual models having the specific model combination and the real object having the specific feature are present in the AR space, executing a special effect corresponding to both the specific model combination of the virtual models and the specific feature of the real object; and
displaying, by a display, the plurality of virtual models together with the background image based on the special effect in the AR space.

* * * * *